(12) United States Patent
Levy et al.

(10) Patent No.: US 7,613,367 B2
(45) Date of Patent: Nov. 3, 2009

(54) OPTICAL SENSOR AND MODULATOR

(75) Inventors: Oren Levy, Shoham (IL); Ben-Zion Steinberg, Kfar Saba (IL); Amir Boag, Yavne (IL); Slava Krylov, Holon (IL); Ilan Goldfarb, Holon (IL)

(73) Assignee: Ramot At Tel-Aviv University Ltd., Tel-Aviv (IL)

( * ) Notice: Subject to any disclaimer, the term of this patent is extended or adjusted under 35 U.S.C. 154(b) by 77 days.

(21) Appl. No.: 11/365,815

(22) Filed: Mar. 2, 2006

(65) Prior Publication Data
US 2006/0198567 A1 Sep. 7, 2006

Related U.S. Application Data

(60) Provisional application No. 60/657,437, filed on Mar. 2, 2005.

(51) Int. Cl.
G02B 6/00 (2006.01)
G02B 6/10 (2006.01)
G01B 9/02 (2006.01)

(52) U.S. Cl. .......................... 385/13; 356/480; 385/129

(58) Field of Classification Search ................. 356/480; 385/12, 13, 129
See application file for complete search history.

(56) References Cited

U.S. PATENT DOCUMENTS 7,068,865 B2 * 6/2006 Hamann et al. ................. 385/8
2006/0067605 A1 * 3/2006 Mirkarimi et al. ............. 385/12

OTHER PUBLICATIONS

Brown, K. et al; "Simple Resonating Microstructures for Gas Pressure Measurement"; *J. Micromech Microeng.*, vol. 12, pp. 204-210 (2002).
De Brabander, et al; Integrated Optical Micromachined Pressure Sensor with Spectrally Encoded Output and Temperature Compensation; *Appl. Otpics*, vol. 37, pp. 3264-3267 (1998).
Hah, D. et al, "An Optomechanical Pressure Sensor Using Multimode Interference Couplers with Multimode Waveguides on a Thin p+-Si membrane"; *Sensors and Actuators*, vol. 79, pp. 204-210 (2000).
Iwayama Y. et al; "Optically Tunable Gelled Photonic Crystal Covering Almost the Entire Visible Light Wavelength Region", *Langmuir (ACS Journal of Surfaces and Colloids)*, vol. 19, No. 4, pp. 977-980 (2003).

(Continued)

*Primary Examiner*—Uyen Chau N Le
*Assistant Examiner*—John M Bedtelyon
(74) *Attorney, Agent, or Firm*—Browdy and Neimark, P.L.L.C.

(57) ABSTRACT

An optical device is presented for use in modulation of light and/or in sensing an external field, by at least partially, directly or indirectly exposing the device to the controllable or unknown external field. The device comprises a waveguide structure configured to define at least a first light channel having a light input and a light output, and having a first deformable resonating structure. The device thereby allows exposure of said at least first channel to the external field of the kind affecting a deformation of the first resonant structure thus causing a change in the first resonant wavelength, resulting in a corresponding change in at least one parameter of light output from said first channel, said change in the output light parameter being indicative of the external field.

23 Claims, 7 Drawing Sheets

OTHER PUBLICATIONS

Leviatan, Y. et al; "Analysis of Electromagnetic Scattering from Dielectric Cylinders using a multifilament Current Model"; *IEEE Trans. Antenn. Propag.*, vol. 35, pp. 1119-1127 (1987).

Malki, A. et al; "Optical Fiber Accelerometer Based on a Silicon Micromachined Cantilever"; *Appl. Optics*. vol. 34, pp. 8014-8018 (1995).

Muller, R. et al; "Silicon Compatible Waveguides Used for an Integrated Opto-mechanical Pressure Sensors"; *Opt. Mater*, vol. 17, pp. 255-258 (2001).

Park, W. et al, "Mechanically Tunable Photonic Crystal Structure", *Appl. Phys. Lett*. vol. 85, pp. 4845-4847 (2004).

Rajic, S. et al; "Feasibility of Tunable MEMS Photonic Crystal Devices"; *Ultramicroscopy*; vol. 97, pp. 473-479 (2003).

Steinberg, B.Z. et al; "Sensitivity analysis of Narrowband Photonic Crystal Fibers and Waveguides to Structure Variations ad Inaccuracy", *J. Opt. Soc. Am*. vol. 20, pp. 138-146 (2003).

Teik-Cheng Lin, "Constitutive Relationship of a Material with Unconventional Poisson's Ratio"; *J. Mat. Sci. Lett*. vol. 22, pp. 1783-1786 (2003).

Xu, B. et al; "Making Negative Poisson's Ratio Microstructures by Soft Lithography"; *Adv. Mater*, vol. 11, pp. 1186-1189 (1999).

\* cited by examiner

OPTICAL SENSOR AND MODULATOR

FIELD OF THE INVENTION

This invention is in the field of optical sensors, modulators, and methods for use in optical sensing and modulation. The invention is particularly useful in micro-electro-mechanical systems (MEMS).

LIST OF REFERENCES

The following references are considered to be pertinent for the purpose of understanding the background of the present invention:

[1] G. De Brabander, G. Beheim, J. T. Boyd, "Integrated optical micromachined pressure sensor with spectrally encoded output and temperature compensation", Appl. Optics, 37, 3264 (1998).
[2] R. Muller, P. Obreja, V. Banu, I. Pavelescu, D. Dascalu, "Silicon compatible waveguides used for an integrated opto-mechanical pressure sensors", Opt. Mater. 17, 255 (2001).
[3] D. Hah, E. Yoon, S. Hong, "An optomechanical pressure sensor using multimode interference couplers with multi-mode waveguides on a thin $p^+$-Si membrane", Sensors and Actuators 79, p. 204-210, (2000).
[4] K. Brown, W. Allegretto, F. Vermeulen, A. Robinson, "Simple resonating microstructures for gas pressure measurement", J. Micromech. Microeng. 12, 204 (2002).
[5] A. Malki, P. Lecoy, J. Marty, C. Renouf, P. Ferdinand, "Optical fiber accelerometer based on a silicon micromachined cantilever", Appl. Optics 34, 8014 (1995).
[6] Teik-Cheng Lin. "Constitutive relationship of material with unconventional Poisson's ratio", J. Mat. Sci. Let., 22, 1783-1786 (2003).
[7] B. Xu, F. Arias; S. Brittian, X. Zhao; B. Grzybowski, S. Torquato, G. M. Whitesides, "Making Negative Poisson's Ratio Microstructures by Soft Lithography", Adv. Mater. 11, 1186 (1999)
[8] S. Rajic, J. Corbeil, P. Datskos, "Feasibility of tunable MEMS photonic crystal devices", Ultramicroscopy, 97, 473 (2003).
[9] Y. Iwayama, J. Yamanaka, Y. Takiguchi, M. Takasaka, K. Ito, T. Shinohara, T. Sawada, M. Yonese, "Optically tunable gelled photonic crystal covering almost the entire visible light wavelength region", Langmuir (ACS Journal of Surfaces and Colloids), 19 (4), 977 (2003).
[10] W. Park, J. Lee, "Mechanically tunable photonic crystal structure", Appl. Phys. Lett. 85, 4845 (2004).
[11] B. Z. Steinberg, A. Boag, R. Lisitsin, "Sensitivity analysis of narrowband photonic crystal fibers and waveguides to structure variations and inaccuracy", J. Opt. Soc. Am. A 20, 138 (2003).
[12] Y. Leviatan, A. Boag, "Analysis of electromagnetic scattering from dielectric cylinders using a multifilament current model", IEEE Trans. Antenn. Propag. 35, 1119 (1987).

BACKGROUND OF THE INVENTION

Micro-electro-mechanical-systems (MEMS) sensors often rely upon the precise measurement of micro-displacements of a sub millimeter flexible component. Commonly employed methods include measurements of the charge on a variable capacitor, the resistance of piezoresistor, and, more rarely, tunneling of current through an air gap.

Optical sensing technologies exhibit several inherent advantages in comparison with these techniques, such as environmental ruggedness, passivity, resistance to electromagnetic interference, light weight, small size, low power consumption, wide bandwidth, and high sensitivity. However, minimization and integration of large-scale optical sensors with small MEMS devices represents a challenge. Recent studies on such integration include waveguides and optical fibers for various pressure [1-4] and acceleration [5] detectors.

SUMMARY OF THE INVENTION

There is a need in the art for sensing and modulation techniques, especially for measuring mechanical strains (deformation) and/or temperature field, by means of miniature and highly sensitive devices.

The present invention solves the above problem by providing a novel sensor device utilizing tunable optical filter(s) (e.g. resonance structure) and an effect of a change in a change in the output light parameter caused by the effect of the external field on the transmitting wavelength(s) of the tunable filter(s). The affectable light parameter may be amplitude of output light in case of a single light propagation channel (the light being coherent or not), or a change in amplitude or beat frequency of a superposition of optical fields of suitably close wavelengths while coupled from different optical channels.

Generally, beat frequency refers to the frequency of beats, i.e. the periodic variations in the amplitude of a summation wave containing two sinusoidal components of nearly equal frequencies. In other words, beat frequency is the difference frequency produced by the intermodulation of two frequencies.

In a preferred embodiment, the tunable optical filter(s) is implemented as an optical resonator(s). The external field causes a change in the physical parameter (typically dimension) of the resonator structure, thus shifting the resonance frequency thereof. Considering the coherent light coupling from two different channels, the shift of resonance frequency in turn results in the beat frequency change.

Preferably, the invention utilizes a defect-containing photonic crystal as the resonating structure. This enables the device to be very small, as well as capable of detecting very small fields (nano-displacement) with high sensitivity.

Also, in a preferred embodiment, the photonic crystal or defected photonic crystals carried by a flexing structure (flexure) of a predetermined Poisson ratio. In this context, flexing structure refers to a structure defining a rigid frame or skeleton defining a few (at least two) arms connected in flexing regions. A force exerted on such a flexing structure causes some stress in the arms of the flexing structure, but in the flexing regions of the flexure structure, it is mostly a shear stress. In some preferred embodiments, the flexing structure is implemented as a compliant mechanism. In some preferred embodiments, the flexing structure is micro-mechanical. In some preferred flexing structure configurations, the flexing structure arms (links) are constituted by beams of different and/or non-uniform cross-sections. The arms can form various 2D and 3D corners in the flexing regions. Depending on an application, the flexing structure may be configured to have a selected Poisson ratio, for example a negative Poisson ratio (NPR), a zero Poisson ratio, or a relatively high positive Poisson ratio.

Thus, according to one broad aspect of the present invention, there is provided an optical device for use in modulation of light and/or in sensing an external field, by at least partially, directly or indirectly exposing the device to the controllable or unknown external field, the device comprising a waveguide structure configured to define at least a first light channel having a light input and a light output, and having a first deformable resonating structure, the device thereby allowing exposure of said at least first channel to the external field of the kind affecting a deformation of the first resonant structure thus causing a change in the first resonant wavelength, resulting in a corresponding change in at least one parameter of light output from said first channel, said change in the output light parameter being indicative of the external field.

Preferably, the waveguide structure is configured to define first and second light channels, each having light input and light output, where the channels are optically coupled at their outputs. The second channel is configured for passing therethrough a second light component of a second wavelength of a predetermined relation with said first resonant wavelength. Light coupled at the outputs of said first and second channels thus present a superposition of the first and second light components having a beat frequency and amplitude. A change in at least one of the beat frequency and amplitude is indicative of the external field.

Preferably, at least the first channel is a defect containing photonic crystal. Both the first and second channels may include defect containing photonic crystals.

The device may be configured so as to allow both the first and second channels to be exposed to the same external field, or to screen the second channel from the external field to which the first channel is exposed.

The second channel may also be configured as a second resonating structure having the second resonant wavelength. The first and second resonant wavelengths may be different but close to each other when in an inoperative (reference) position of the device. Alternatively, the first and second wavelengths are equal when in the reference position.

The inputs of the first and second channels are optically coupled to a laser based light source system. For example, the single laser source is used, and light emitted by the laser source is split between the first and second channels. The device may thus include an input light splitter for splitting light from the light source system into the first and second light channels, and an output coupler for coupling light propagating in the first and second light channels and directing the output coupled light onto a light detector.

As indicated above, the invention preferably utilizes a flexing structure carrying at least the first channel of the waveguide structure. The flexing structure is configured with a negative Poisson ratio, and is capable of transforming a uniaxial force in directions along two perpendicular axes. Such a flexing structure is preferably a silicon-based structure. The flexing structure may be configured as an inversed honeycomb structure. Preferably, such an inversed honeycomb structure is modified to be composed of an array of unit cells, each formed by vertical beams (links), re-entered links, and horizontal links. Preferably, the flexing structure is configured as a MEMS structure.

According to another broad aspect of the invention, there is provided a method for use in modulation of light and/or in sensing an external field, the method comprising: passing a first light portion of coherent light of multiple wavelengths through a first light channel so as to receive a first light component of a first frequency affectable by the external field, the first light channel including a deformable resonating structure of a resonance frequency defining and equaling said first frequency; passing a second light portion through a second light channel so as to receive a second light component of a second frequency being in a predetermined relation with said first frequency; coupling said first and second light components so as to produce their superposition; thereby enabling modulating said superposition by directly or indirectly exposing said resonating structure to the external field, said modulating being on a beat frequency of the first and second light components and being indicative of the external field.

According to yet another broad aspect of the invention, there is provided an optical device comprising a photonic crystal and a flexing structure of a predetermined Poisson ratio carrying said photonic crystal.

BRIEF DESCRIPTION OF THE DRAWINGS

In order to understand the invention and to see how it may be carried out in practice, preferred embodiments will now be described, by way of non-limiting example only, with reference to the accompanying drawings, in which.

DETAILED DESCRIPTION OF EXEMPLARY EMBODIMENTS

Figure 1A:
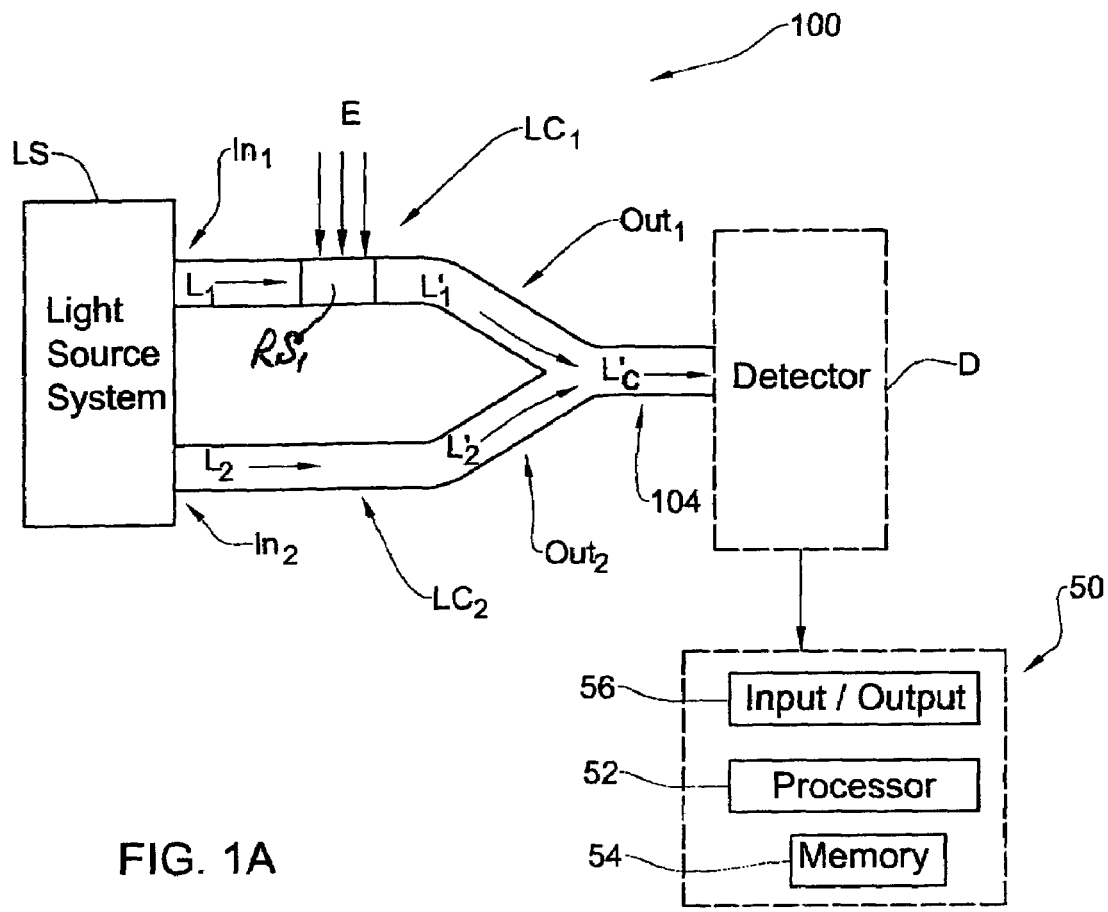
FIGS. 1A and 1B are schematic illustrations of two examples of a sensor device of the present invention.

Referring to FIG. 1A there is schematically exemplified an optical device 100 of the invention for sensing an external field E to which the device is at least partially exposed, directly or indirectly, or for effecting modulation of light at the device output by controllably varying the applied field. More specifically, the invention is used for measuring the field of a kind effecting a deformation in at least a portion $RS_1$ of the sensor directly or indirectly exposed to said field, and is therefore described below with respect to this specific application. Deforming field E can be constituted by at least one of a force, pressure, temperature, electric field, magnetic field, radiation or some other deforming field. The deformation caused by such an external deforming field can be either elastic or inelastic.

Preferably, a deformation caused by a movement of a body, attached or other way coupled (e.g. contactlessly) to the sensor, is measured. The movement of the body can be induced by any physical phenomenon. In such an indirect exposure case, deforming field E can be considered as constituted by a field causing the movement of the attached body, though the direct cause of the deformation is the force from the attached body.

Sensor/modulator device 100 includes a waveguide structure, which defines at least a first channel (waveguide) $LC_1$ defining a first light input $In_1$ and a first light output $Out_1$ for light propagation between them. In the example of FIG. 1A, the sensor/modulator device includes also a second light channel (waveguide) $LC_2$ defining a second input $In_2$ and a second output $Out_2$ for light propagation between them; and an output coupler 104 coupling the first and second light channel outputs. It should be understood that generally the configuration may be such that the input and output of a light channel are constituted by the same end of the respective waveguide.

Sensor device 100 is associated with a light source system LS, which may or may not be a constructional part of the device. Light source system LS is configured to input light into channels $LC_1$ and $LC_2$ (or the single channel as the case may be), and may include a single light source for both channels or separate light sources each associated with the respective light channel. Considering the single channel configuration, the light source system may be any system, coherent or not, and the device allows for determining a relation between the applied field and a change in the amplitude of output light. In the two-channel design of FIG. 1A, the light source system is a laser based system such as to enable creation of a beat frequency formed by a superposition of two suitable close wavelengths. Preferably, each of the two waves forming the beats is coherent for a longer time given by the largest of the following: the time of a few beat periods, or the time equal to the difference of the two optical paths divided by the speed of light. Also, the coherence length of the light beams might be selected to be larger than the difference in their optical paths.

Channel $LC_1$ is intended for at least partial exposure to the external field (directly or indirectly), and is configured as a multi-mode (multi-frequency propagating) light channel and includes deformable portion $RS_1$ of the sensor, which is configured as a resonating structure. A resonant frequency $f_1$ of the resonating structure depends on a dimension d of the resonating structure, e.g. on one or more of such structure parameters as length, width, height, area, cross-section, volume, shape. Deformation of resonant structure $RS_1$ effected by field E will cause a change in the resonant frequency $f_1$. To this end, light input into at least channel $LC_1$ is broadband light of a frequency range F including frequency $f_1$.

It should be noted that the present invention is not limited to the field measurement/light modulation utilizing beating of two light beams, but may utilize measurement of a change (e.g. attenuation) of a "single frequency" light that passes through the resonator. If the resonance frequency changes, the amplitude of the "single frequency" beam will be significantly changed, in accordance with the amplitude frequency distribution of input light.

Thus, according to the example of the invention, sensor 100 operates as follows. A light beam $L_1$ is input into light channel $LC_1$. Resonating structure $RS_1$ is configured to allow a passage therethrough of mostly its resonance frequency, which in the inoperative position of the resonating structure is equal to $f_1$. Light output of the resonating structure is denoted $L_1'$. A light beam $L_2$ is input into light channel $LC_2$. Light channel $LC_2$ is configured to allow a passage therethrough of a light beam $L_2'$ of some frequency $f_2$ being in a predetermined relation $f_2(f_1)$ with frequency $f_1$. At output coupler 104, a superposition $L_c'$ of light beams $L_1'$ and $L_2'$ is formed. This superposition can be detected by a light detector D which may or may not be a part of sensor device 100.

Superposition has a beat frequency $f_B=|f_1-f_2|$. It should be noted that frequencies $f_1$ and $f_2$ may or may not be equal. When channel $LC_1$ is exposed to external field E, deformation of the resonating structure caused by this field will cause a shift $\Delta f_1$ in the resonance frequency $f_1$, the output of channel $LC_1$ thus being of frequency $(f_1+\Delta f_1)$. Accordingly, the detected beat frequency is $f_{B2}=|f_1+\Delta f_1-f_2(f_1+\Delta f_1)|$. Having acquired a change in the beat frequency $\Delta f_B=f_B-f_{B2}$, a current value of external field E can be determined, as will be described more specifically further below. It should be noted, and is described more specifically further below that frequency $f_2$ may be a constant or may be in another way related to frequency $f_1$. Thus, in most general case $f_2(f_1)$ should be considered, which may or may not be constant.

Various possibilities exist to create the predetermined relation between frequencies $f_2$ and $f_1$. One example of a predetermined relation is $f_2(f_1)$=const. Such relation can be enabled (realized) by various configurations of sensor device 100. For example, different light sources can be used to input light into channels $LC_1$ and $LC_2$, where the light source associated with channel $LC_2$ generates light of the constant frequency $f_2$ only; or irrespective of whether the different light sources or the common broadband light source is used, the light input to or light propagating through channel $LC_2$ is of frequency $f_2$ only (e.g. a frequency filter being provided at the input or inside this channel). In any of these cases, light channel $LC_2$ may be either a single-mode or a multi-mode channel allowing propagation of frequency $f_2$. According to a preferred embodiment of the invention, the sensor device is configured such that at least channel $LC_1$ includes a defect containing photonic crystal, the defect presenting resonating structure $RS_1$.

According to another preferred embodiment of the invention, the sensor device is configured such that at least one of the light channels includes a defect containing photonic crystal configured as a cavity coupled waveguide (CCW).

In the example of FIG. 1A, device 100 is configured with the resonating structure in channel $LC_1$ only, while channel $LC_2$ may be either exposed to the external field or screened therefrom.

Figure 1B:
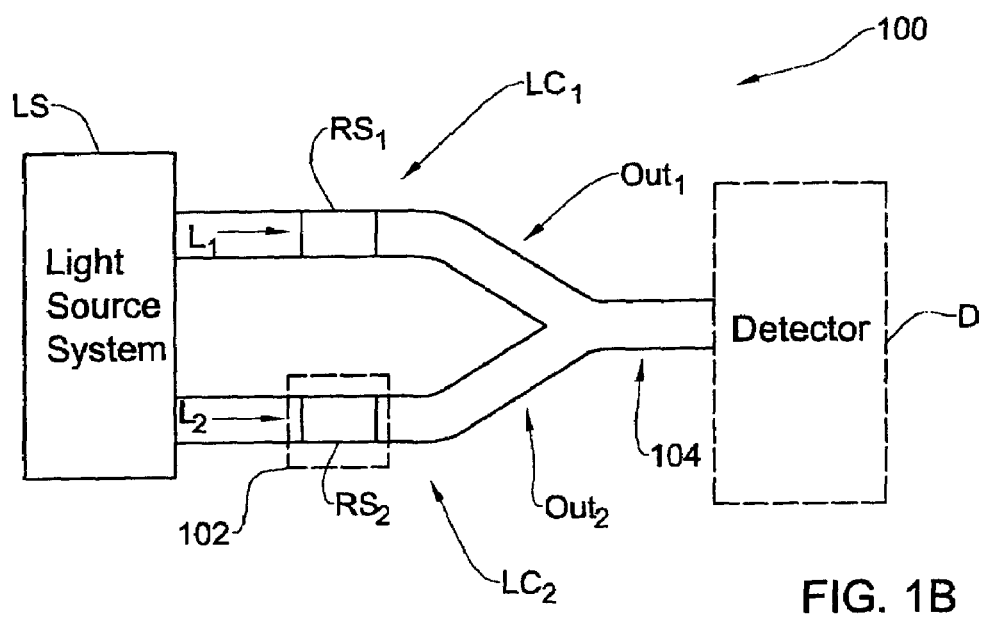

FIG. 1B illustrates another example of a sensor device 100. To facilitate understanding, the same reference numbers are used for identifying those components which are common in all the examples of the invention. The sensor device of FIG. 1B is constructed generally similar to that of FIG. 1A, but is distinguished therefrom in that channel $LC_2$ is also a multi-mode or broadband waveguide having a resonating structure $RS_2$ thereinside. Structure $RS_2$ has a resonating frequency $f_2$.

In the device configuration of FIG. 1B, resonating structures $RS_1$ and $RS_2$ can be configured such that frequency $f_1$ is close or equal to $f_2$ (e.g. the resonating structures are similar or identical). In this case, the device may be configured such that channel $LC_2$ is screened from external field E or the deformation effect induced by the external field E to which channel $LC_1$ is exposed, thus resonating structure $RS_2$ is not affectable by the deforming field E. For example, structure $RS_2$ can be placed in a region outside of that where a deforming field is expected, or structure $RS_2$ can be protected from the effect of a deforming field by a shield 102 as shown in the figure in dashed lines; structure $RS_2$ can be tuned (e.g., by the user) in order to set the operating point and/or dynamic range of the system to the user's convenience. Alternatively, resonating structures $RS_1$ and $RS_2$ are different, thereby enabling both channels $LC_1$ and $LC_2$ to be exposed to the external field that is to be measured.

Preferably, both channels $LC_1$ and $LC_2$ are defect containing photonic crystals. In this case, the relation $f_2(f_1)$=const can be provided as well. Alternatively, the predetermined relation between frequencies $f_1$ and $f_2$ can be provided by making defects (resonating structures) in photonic crystal channels $LC_1$ and $LC_2$ of different sensitivities to the same external field. As indicated above, both channels can be exposed to the field which is to be measured. In this case, the photonic crystals claddings and defect dimensions are preferably different and selected so as to provide on the one hand close frequency values $f_1$ and $f_2$, and on the other hand ensure different changes in $f_1$ and $f_2$ in response to the applied field, for example to satisfy a relation $f_2(E)=f_1(E=0)+\alpha\Delta f_1$, where multiplier $\alpha$ is different from 1.

It should be understood that appropriate device calibration is preferably carried out to determine the beat frequency in the inoperative position of the device; and/or its change as a function of the external field in the operative position of the device.

As exemplified in FIG. 1A, the sensor/modulator device is associated with a control unit 50, which may or may not be an integral part of the device. The control unit is connectable (via wires or wireless) to the output of detector D. Control unit 50 is typically a computer system including inter alia a data processing and analyzing utility 52, a memory utility 54, and input/output utilities, generally at 56. The control unit is configured for receiving data from detector D, and possibly also for using this data for determining the beat frequency of the detected light (e.g. in case the detector is a photodetector incapable of determining the beat frequency by itself), and possibly also for exchanging signals with an operator.

Control unit 50 can be configured for analyzing the detector output using certain reference data and calculation model for the determination/evaluation of a current value $E_v$ of the external field, or for controlling this value in case of light modulation. Alternatively or additionally, the control unit allows for the field $E_v$ determination by presenting to an operator the detected beat frequency and a calibration curve in the form of the beat frequency as a function of the external field variation.

The external field determination can be done as follows: A change $\Delta f_1$ in the resonance frequency $f_1$ is determined from the detected change $\Delta f_B$ in the beat frequency $f_B$ and the equations $f_{B1}=|f_1-f_2(f_1)|$, $f_{B2}=|f_1+\Delta f_1-f_2(f_1+\Delta f_1)|$, and $\Delta f_B = f_{B1}-f_{B2}$. In this connection, it should be noted that the resonance frequency $f_1$ variation with changes in dimension d, $f_1(d)$ is considered, where the deforming field value $E_v$ is determined from a dependence $d(E)$. The functions $f_1(d)$ and $d(E)$ can be previously determined during the calibration or modeling stage.

For example, dependence of a dimension d (e.g. length, area, volume of a resonating structure) on an external field E, constituted by a temperature, is known as phenomenon of thermal expansion; the corresponding function $d(E)$ is often linear. Thus, knowing the coefficient of the thermal expansion of the resonating structure $RS_1$, a change in the external temperature can be determined from a change in the beat frequency of the device. In another example, a change in dimension d (e.g. length, area, volume of a resonating structure) can result from a change in external force or pressure. The corresponding function $d(E)$ in this case is determined by the corresponding elasticity of the resonating structure.

The determination of a change in resonance frequency from the above equations can be facilitated if signs of expressions $f_1-f_2(f_1)$ and $f_1+\Delta f_1-f_2(f_1+\Delta f_1)$ are known a priori and independently of $\Delta f_1$. Thus, preferably a bandwidth F of light input into channel $LC_1$ and a relation between frequencies $f_2$ and $f_1$ are selected so as to constrain frequency $f_1$ to values higher or lower than frequency $f_2$ for all possible values of field E.

As indicated above, the device of the invention can be operated as a light modulator. To this end, the deforming field E is controllably changed. The modulation effect consists of frequency modulation and possibly of amplitude modulation. The frequency modulation is due to the shift of frequency $f_1$ and due to the beats. The amplitude modulation can be reached due to the effective filtering of light component of frequency $f_1$ in light channel $LC_1$ and of light component of frequency $f_2$ in light channel $LC_2$: a change in frequency $f_1$ will lead to a change in the amplitude of output light if amplitude of input light is non-uniformly distributed over the bandwidth F.

Figure 2:
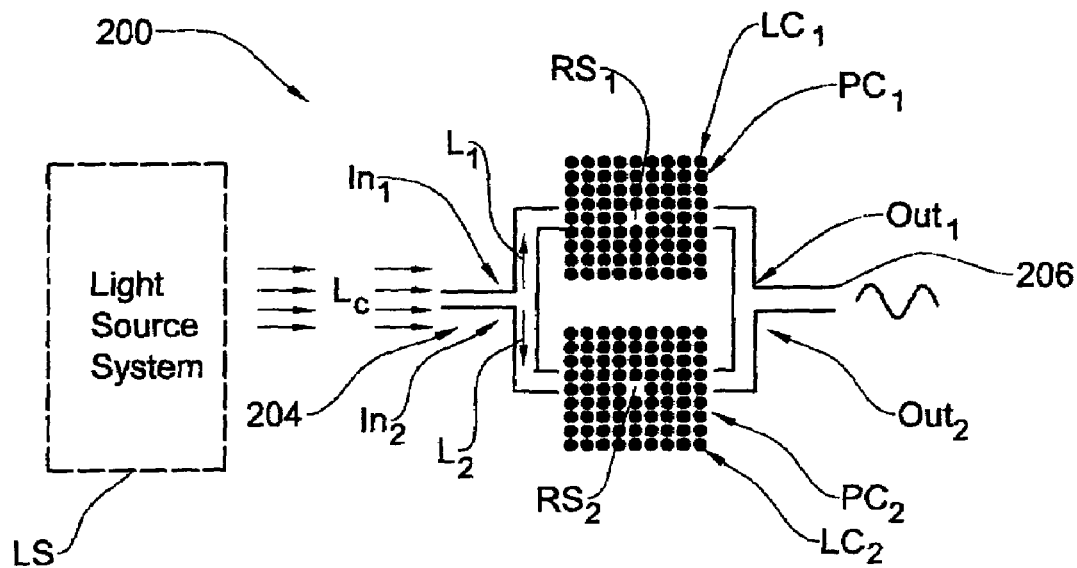
FIG. 2 exemplifies a sensor device of the present using defect containing photonic crystal.

Referring to FIG. 2, a deformation sensor 200 configured according to a preferred embodiment of the invention is exemplified. In this example, each of channels $LC_1$ and $LC_2$ is constituted by a photonic crystal carrying a resonating structure. Each of resonating structures $RS_1$ and $RS_2$ is constituted by a defect (i.e. a resonant cavity, or a plurality of resonant cavities such as the CCW) in the respective photonic crystal (i.e. each of the first and the second channels with its respective resonating structure is constituted by, respectively, a defected photonic crystal $PC_1$ and $PC_2$). Broadband light $L_c$ from a common light source LS is coupled into channels $LC_1$ and $LC_2$ at their inputs $In_1$ and $In_2$ via an input splitter 204, and light propagating through the light channels is coupled at their outputs $Out_1$ and $Out_2$ by an output coupler 206. Splitter 204 may be of any known configuration (e.g. semitransparent mirror) capable of splitting broadband light $L_c$ into light beams $L_1$ and $L_2$ of preferably the same intensity distribution.

While passing through the defected photonic crystals, light beams $L_1$ and $L_2$ loose their non-resonant components. Beams $L_1'$ and $L_2'$ output by the respective resonating structures will contain only resonance frequencies $f_1$ and $f_2$, or, in other terms, wavelengths $\lambda_1$ and $\lambda_2$, respectively. These beams $L_1'$ and $L_2'$ are coupled into a common output beam $L_c'$, being at least a portion of the superposition of beams $L_1'$ and $L_2'$. The beat frequency $f_B$ of the common output beam can be expressed in terms of wavelengths: $f_B=|f_1(\lambda_1-\lambda_2)/\lambda_1|$, assuming the same speed of light for light channels $LC_1$ and $LC_2$. If the case is such that in one arm (channel) of the device light propagates at one speed, and in the second arm light propagates at a different speed, for example because the second arm is made of a different material, the effect of different speeds of light in the two light channels is considered. Preferably, each of the two waves forming the beats is coherent for the time period as described above, or the coherence length of the light beams is larger than the difference in their optical paths.

Figure 3:
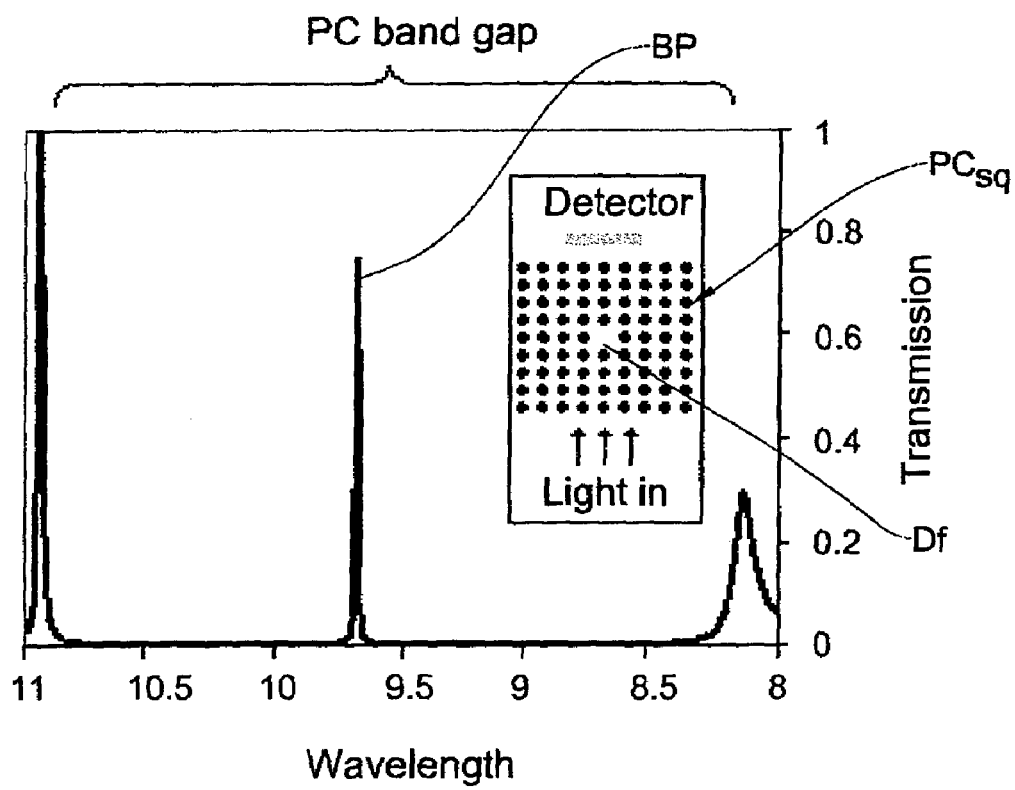
FIGS. 3 to 5 shows numerical analysis of the transmittance properties of a defect containing photonic crystal subjected to a deforming field.
Figure 4:
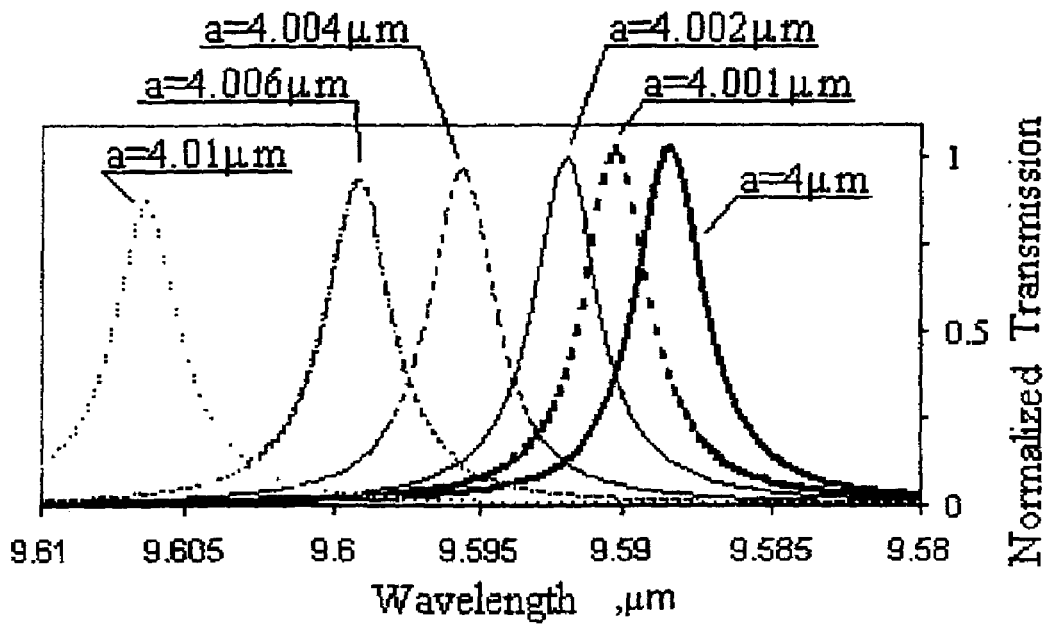
Figure 5:
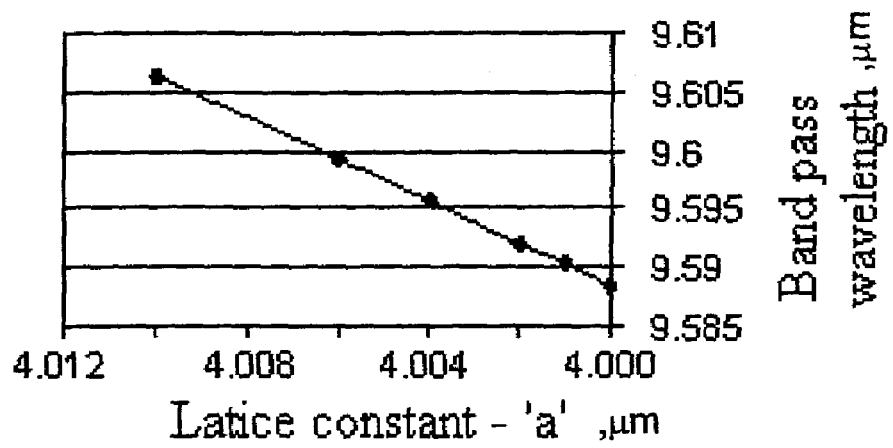

Reference is made to FIGS. 3 to 5 showing the results of a numerical analysis of the light propagation through a defected photonic crystal structure $PC_{Sq}$, which is illustrated in the inset of FIG. 3. This defected photonic crystal $PC_{Sq}$ is suitable for a use in the deformation sensor of the invention. Photonic crystal structure $PC_{Sq}$ is a 9×9 array of unit cells and has a square, 4 μm-periodic lattice. Each lattice site is made of a circular dielectric silicon post of a diameter of 1.2 micron and a relative dielectric constant $\in=11.7$. The silicon posts are surrounded by air. Defected photonic crystal $PC_{Sq}$ has a missing-post defect Df in its center. This defect creates a micro-cavity (a resonant structure). The cavity resonance frequency is sensitive to changes in the cavity size [11].

These silicon posts of the defected photonic crystal can be held together at their upper and/or lower butts by conventional substrate(s) and/or by a flexing structure. In a preferred embodiment, the flexing structure replaces a substrate. Other methods to hold the silicon posts together include connecting them with some polymer.

The inventors computed the full solution of the propagation and scattering problem inside the defected photonic crystal, including the energy distribution and light intensity exiting the PC for different wavelengths and unit cell sizes. The computations were performed with a numerical code based on the Multifilament Current Model [12].

FIG. 3 shows a simulated graph of the normalized transmittance of defected photonic crystal $PC_{Sq}$. As it is seen from graph, the transmittance of photonic crystal $PC_{Sq}$ has a band gap in a range from 10.7 µm to 8.2 µm. An extremely narrow band pass BP within the band gap is also seen in the graph of transmittance; it is opened/created by defect Df. The passing wavelength of the band pass is the resonant wavelength of defect Df and is calculated to be at 9.588 µm. In a preferred configuration, the passing wavelength is in the center of the PC band gap, so as to maximize the operating wavelength range of the sensor device in case the cell size deflections which the sensor of the invention will experience during the operation are expected in both directions.

FIG. 4 shows several graphs of the normalized transmittance of the band pass of photonic crystal $PC_{Sq}$, each graph corresponding to a certain different value of the unit cell size a (constituting the resonating structure dimension d) of photonic crystal $PC_{Sq}$: 4 µm, 4.001 µm, 4.002 µm, 4.004 µm, 4.006 µm, and 4.01 µm. It is seen that for a=4 µm the band pass lies around the wavelength of 9.588 µm; and for the lattice constant a=4.001 µm the band pass lies around the wavelength of 9.590 µm. Thus, it is evident that the passing wavelength (the peak wavelength of the narrow-band pass) largely depends on the micro-cavity dimensions, and that this wavelength increases when the unit cell size increases. Hence, the deformation of the resonating structure under the applied field will cause a change in the light output. It should be noted that a change in the lattice constant in both directions (i.e. deformation that leaves the lattice symmetry unchanged) is possible only if the crystal is situated on the negative Poisson ratio structure (Poisson ratio of −1).

FIG. 5 shows a relation between the passing wavelength corresponding to the maximal intensity and the unit cell size of defected photonic crystal $PC_{Sq}$. This relation is linear, with sensitivity of 1.8 Å band pass shift for every Å of the PC unit cell dilatation. It should be noted, that though deformations of a PC unit cell (e.g. variations in its shape and size) also effects a change in the PC band gap and the light transmission characteristics of the crystal itself [8, 9, 10], these effects are generally of a smaller sensitivity to the PC deformations than the change in the defect resonant frequency.

Identical defected photonic crystals, e.g. two crystals $PC_{Sq}$, can be utilized for implementing defected photonic crystals $PC_1$ and $PC_2$ in the device of FIG. 2. Alternatively, defected photonic crystals $PC_1$ and $PC_2$ can be implemented by different defected photonic crystals.

When two defected photonic crystals (more generally, two light guides having resonating structures thereinside) have different sensitivities to an external field, they both can be effected by the same field without compromising the measurement, because the beat frequency still will change as a result of the applied field. In mathematical expressions, it can be written that in case $f_2(f_1)$=const, the sensitivity $$\frac{df_B}{dE}$$

of the device equals the sensitivity of the first resonating structure $$\frac{df_1}{dE};$$

in other cases the sensitivity $$\frac{df_B}{dE}$$

of the device equals $$\left(1 - \frac{df_2}{df_1}\right)\frac{df_1}{dE}.$$

When two defected photonic crystals $PC_1$ and $PC_2$ are implemented by different defected photonic crystals configured to have close or equal resonant frequencies $f_1$ and $f_2$, the derivative $$\frac{df_2}{df_1}$$

is expected to be different from 1, thus providing a non-zero sensitivity in the case when both crystals are affected by the external field. The latter case may be of importance when screening of one of the two defected photonic crystals is hard to achieve and/or when miniaturization of the device is desired, even at the price of its sensitivity.

It should be understood, that in case the device is subjected to different external fields, this can lead to deformations of different types. For example, an effect of gas or liquid pressure or temperature field often results in equal scaling of body dimensions for all directions, while a uniaxial external force or displacement (e.g. applied in a place of contact with some other body) often causes different strains in different directions. Thus, for the case of the uniaxial external force, theoretical results of FIGS. 4-5 should not be applied, unless a Negative Poisson Ratio (NPR) flexure is used with Poisson ratio of −1, as will be described below. In this anisotropic case of force (load) application, the use of the above described calibration procedure can significantly facilitate the preparation of the device for operation, because modeling of the light propagation in an anisotropic medium can be avoided.

It should be noted that it might be preferable to redistribute a uniaxial external load into a biaxial or a threeaxial and possibly an isotropic external load when using the sensor device of the present invention. Such redistribution can reduce the stress in the device, thus preventing it from breakage, and also can increase the sensitivity of the device.

This sensitivity of the device to a load is determined by a change in the beat frequency on the light detector caused by the load. Often, the change in the resonance frequency and thus the change in the beat frequency is approximately proportional to a change in the area of the resonator (e.g. in the case of a micro-cavity defect in a 2D photonic crystal) or to a change in the volume of the resonator (e.g. in the case of a micro-cavity defect in a 3D photonic crystal). In the 2D case, if two linear dimensions of a resonator are equal, and changes in these dimensions are connected by a Poisson ratio v, the change in the beat frequency will be approximately proportional to (1−v). For the most common materials, v is close to ⅓.

However, it is possible to redistribute the load so as to control the sensitivity of the device. To this end, the entire waveguide structure or at least one part thereof associated with that light channel which is exposed to the external load, may be carried by a flexing structure configured to have a predetermined a Poisson ratio and to transmit an external force to a resonating structure of the deformation sensor.

In a preferred configuration, aimed at increasing the sensitivity of the deformation sensor to the external force, the flexing structure is configured to have a negative Poisson ratio (NPR). The nature of NPR structures and materials is that they are expandable in at least one direction perpendicular to an externally exerted tension. In the present invention, the ability of NPR structures/material to expand/compress along at least two principal axes under an application of a uniaxial stress can be employed for increasing the sensitivity of the device, by causing a higher change in the beat frequency than in the case of a conventional material-defined Poisson ratio.

Also, in a preferred embodiment including a flexing structure configured to have a Poisson ratio $v=-1$ the symmetry of a defected photonic crystal upon deformation by the flexing structure can be maintained, and the defected photonic crystal will undergo an isotropic deformation. Such a deformation allows for precise tuning of the passing wavelength by affecting the degree and sign of the deformation, and independently on the direction of the force causing the deformation. Hence, a device utilizing a flexing structure of a Poisson ratio $v=-1$ is expected to measure nano-scale displacements with improved precision and sensitivity.

Figure 6A:
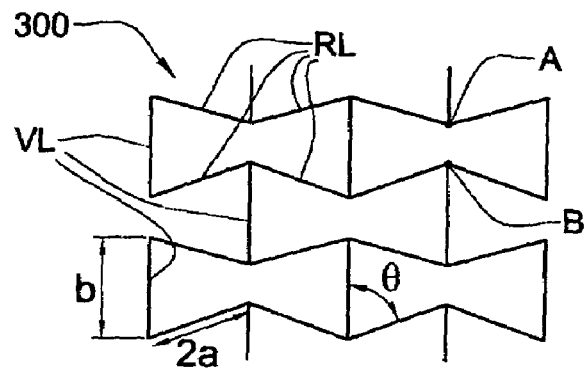
FIGS. 6A and 6B show a typical negative Poisson ratio (NPR) honeycomb structure respectively in the structure's undeformed and deformed states.
Figure 6B:
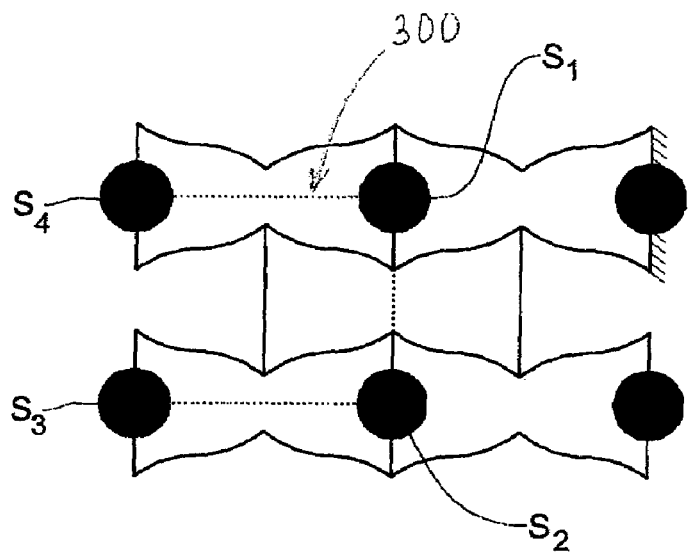

One example of the NPR structure is an inversed (reentered) honeycomb structure. A honeycomb flexing structure is composed of an array of unit cells, such as a cell 300 exemplified in FIG. 6A, where the top view of cell 300 is shown. In FIG. 6B, cell 300 is deformed; also the silicon posts $S_1$-$S_4$ constituting the Photonic crystal cell and being carried by the flexing structure cell are shown. The Poisson ratio of the honeycomb flexing structure at small deflections is equal to $v=\sin\theta \tan\theta/((b/2a)-\cos\theta)$, where $\theta$ is the angle between a vertical VL link and a re-entered link RL of unit cell 300 [6].

Figure 6C:
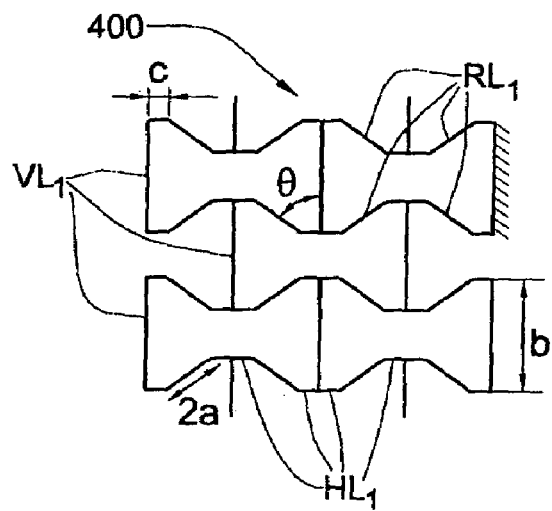
FIG. 6C illustrates a unit cell of an NPR flexing structure of the present invention.

For example, a square cell NPR structure with an angle $\theta=45°$ has a Poisson ratio $v=-1$. However, in this case flexing regions (corners, nodes) A and B may meet under compression stress. It may be desirable to separate corners A and B to avoid their interaction with each other. To this end, corners A and B can be arranged at different levels in the direction perpendicular to the plane of the flexing structure in order to make this square cell micro-mechanical structure of Poisson ratio −1. FIG. 6C exemplifies an NPR flexing structure unit cell 400 of the present invention. This NPR unit cell is composed of vertical beams (links), generally at $VL_1$; re-entered links, generally at $RL_1$; and horizontal links, generally at $HL_1$. The horizontal links straighten (or "cut") the corners A and B of the conventional structure of FIG. 6A.

It may be desired to keep the elasticity of the flexing structure almost as high as in the conventional case. To this end, the length c of the horizontal links may be small (of about a fraction of the lengths a and b). For larger lengths c the same displacement of structure 400 will require from re-entered links $RL_1$ to turn in a larger angle and will cause higher shear stress in the flexing regions connecting the reentered links with the horizontal links. Thus the stiffness of structure 400 generally increases with an increase in the length c of the horizontal links.

It should be noted, that the stiffness of the flexing structure can be preselected. For example it is possible to cause large deformations in the flexing structure by application of relatively small forces. To this end, the beams exposed to the external force (i.e. those on the left side of the flexing structure) can be elongated so as to provide for a larger arm and thus for a larger torque. Hence, the sensitivity of the flexing structure deformation to the external force can be significantly increased. On the other hand, if the external field is constituted by a displacement, then the corresponding side arm can be shortened so as to increase the force exerted on the structure. Hence the sensitivity of the flexing structure to the external displacement can be controlled as well.

A flexing structure with unit cell 300 or 400 or with another unit cell of a predetermined Poisson ratio can be implemented as a MEMS structure. Since in microfabricated devices, the use of hinges may be precluded due to tribological issues it may be preferred to realize such a structure as a compliant mechanism composed of flexible beams (arms) connected by flexing regions. For example, flexing structure unit cell 400 can be fabricated on silicon as a MEMS structure. Micromachining techniques [7] can be used for the fabrication of this flexing structure unit cell.

Unit cell 400 can be a square unit cell providing for a Poisson ratio of −1. To this end the angle $\theta=45°$ and lengths a, b, and c are selected so as to form a square cell.

The inventors have performed a mechanical analysis of NPR flexing structure unit cell 400 using analytical and numerical (finite element) methods in frameworks of small and large deflection theories, to measure the Poisson ratio. The inventors have found that the flexing structure of the invention can be integrated with MEMS devices and can be used for MOEMS measurements of, for example, micro displacement of MEMS devices.

Figure 7A:
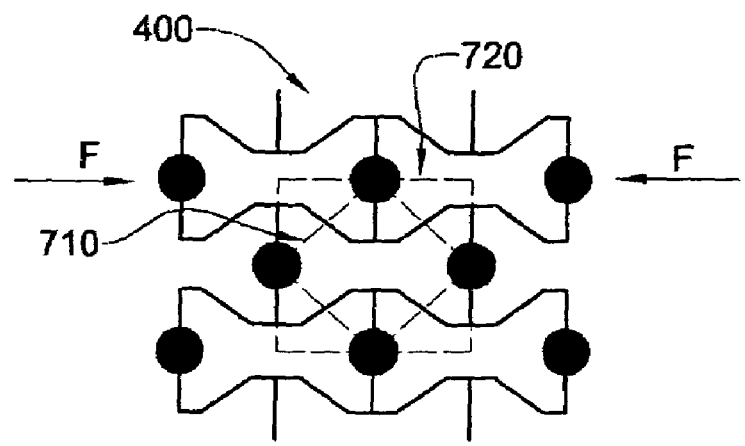
FIGS. 7A and 7B show a part of the sensor device of the present invention utilizing the flexing structure of FIG. 6C.
Figure 7B:
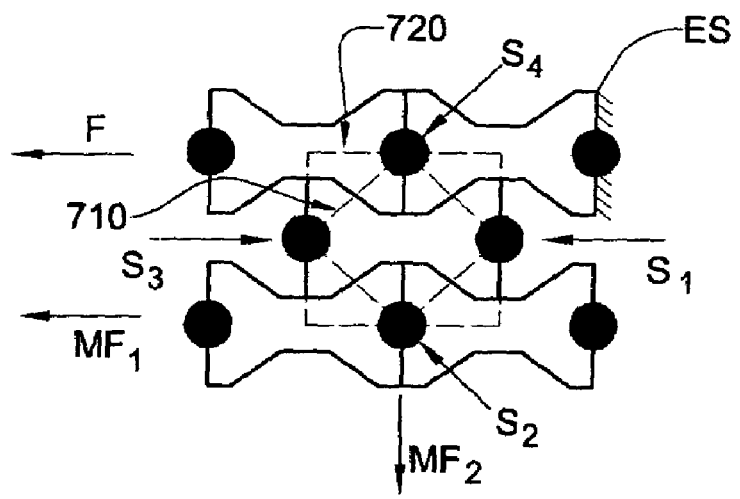

Referring to FIGS. 7A and 7B there is exemplified a part 700 of the sensor device formed by the butt-end of a light channel (photonic crystal) $LC_1$, constituted by the silicon posts carried by the respective part of a flexing structure 400 configured as described above. This light channel contains a resonating structure (not shown) and is to be exposed to an external force (field), though not directly, but indirectly via the flexing structure: when an external force is applied to the flexing structure, it is transmitted to the light channel through the change in the size of the flexing structure unit cell.

The second light channel of the optical device may also be carried by the same flexing structure, e.g. in case the device is configured to expose (through the flexing structure) both channels to the same external force. Alternatively, the second light channel can be fixed on some other flexing structure and screened from or not exposed to an external deforming field. Alternatively, the second light channel can be fixed on a flexing structure of a Poisson ratio greater than 1 so as to undergo a shift in the transmitting wavelength opposite in sign to the shift in the transmitting wavelength of the first light channel, when each of the first and the second light channels is exposed to the external field, thereby increasing sensitivity of the device.

In the present example, the device part 700 is composed of a PC unit cell 710 of a defected photonic crystal $PC_{Sq}$ (described above with reference to FIGS. 3-5) carried by an NPR flexing structure unit cell 720 similar to the above described flexing structure cell 400 of FIG. 6B. PC cell 710 is defined by silicon posts $S_1$-$S_4$. Flexing structure cell 720 is a square of a size 5.66×5.66 μm and has a Poisson ratio $v=-1$. This NPR flexing structure is made of Si with a thin $SiO_2$ cladding ($\in/\in_0=2.56$) laid on a flexing structure side facing the photonic crystal structure. Flexing structure cell 720 supports PC cell 710 of the 4 μm-periodic square PC lattice; PC cell 710 is oriented at 45° relatively to flexing structure cell 720. An enlargement in the PC cell size will be $\sqrt{2}$ times the enlargement in the flexing structure cell size. Due to the square symmetry of the PC and flexing structure cells, the ratio of $\sqrt{2}$ between their sizes will be maintained in a course of mechanical deformation.

When an external force is applied to the flexing structure, the band pass filtering properties of defected photonic crystal $PC_{Sq}$ will consequently change. Since the sensitivity of the passed wavelength of defected photonic crystal $PC_{Sq}$ to the change in the PC cell size is 1.8 (as in FIG. 5), the sensitivity of the passed wavelength to the change in the flexing structure cell size will be $1.8 \times \sqrt{2} = 2.54$.

Also, the flexing structure can be fixed at some place by attaching one cell of the flexing structure to an external support. This is exemplified in FIG. 7B, wherein an external support ES holds the entire flexing structure. This configuration allows for measurement of the displacement of a horizontally movable end $ME_1$ or a vertically movable end $ME_2$ of the flexing structure.

Figure 8A:
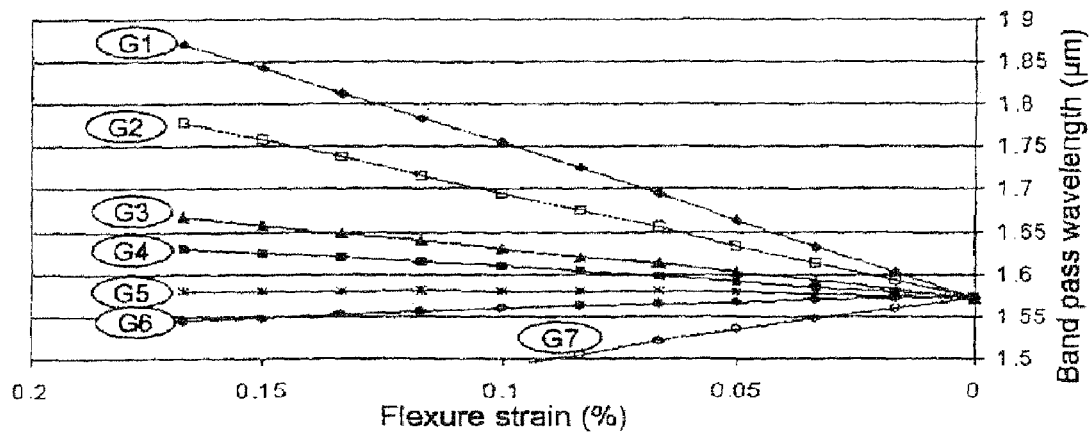
FIGS. 8A and 8B illustrate the dependence of the sensitivity of the defected photonic crystal on a Poisson ratio of the photonic crystal carrier.

Referring to FIG. 8A, there are exemplified several possible dependencies $G_1$-$G_7$ of a band pass wavelength on a flexure strain for a defected photonic crystal. Dependencies (graphs) $G_1$-$G_7$ correspond to different flexing structures holding the photonic crystals. Graphs $G_1$-$G_7$ are approximately linear, but have different slopes, meaning the sensitivities of the defected photonic crystal band pass wavelength to the strain. These sensitivities are different because they correspond to different Poisson ratios of the flexing structures being in the foundation of the defected photonic crystal.

In the present example, the defected photonic crystal is a 8×8 array of unit cells with one missing-post at the center of the lattice. The lattice constant is 0.6 μm. The diameter of the circular silicon posts (dielectric constant $\epsilon/\epsilon_0 = 11.7$) is 0.228 μm; they are surrounded by air. The missing-post at the center of the photonic crystal lattice creates a micro cavity with a resonant frequency of 1.572 μm within the band gap being between 1.39 μm and 2.4 μm for the undeformed photonic crystal.

Graph $G_2$ corresponds to an isotropic expansion of the photonic crystal and a flexing structure of Poisson ratio of −1. In this configuration, the band pass wavelength reaches a value of 1.778 μm for unit cell size of 0.70×0.70 μm, as can be seen from the following table:

| Strain in X direction (%) | Unit cell dimension x × y [μm] | Band pass wavelength [μm] |
|---|---|---|
| 0.0000 | 0.60 × 0.60 | 1.573 |
| 0.0166 | 0.61 × 0.61 | 1.593 |
| 0.0333 | 0.62 × 0.62 | 1.613 |
| 0.0500 | 0.63 × 0.63 | 1.633 |
| 0.0667 | 0.64 × 0.64 | 1.655 |
| 0.0833 | 0.65 × 0.65 | 1.675 |
| 0.1000 | 0.66 × 0.66 | 1.695 |
| 0.1167 | 0.67 × 0.67 | 1.715 |
| 0.1333 | 0.68 × 0.68 | 1.738 |
| 0.1500 | 0.69 × 0.69 | 1.758 |
| 0.1667 | 0.70 × 0.70 | 1.778 |

Graphs $G_1$-$G_7$ illustrate that the sensitivity of the device is larger for flexing structures having a smaller Poisson ratio. For example, as it can be seen from graph $G_1$, the device with the negative Poisson ratio $\nu = -2$ shows a high sensitivity $R = 1.79$ μm/% (microns per percent of strain). The device with the Poisson ratio of $\nu \sim 0.7$ shows almost no sensitivity to dilatation (graph $G_5$). The device with Poisson ratio of $\nu = 2$ shows a negative sensitivity $R = -0.83$ (graph $G_7$). The band pass wavelength sensitivities to unit cell deformation are presented in the following table:

| Poisson Ratio | $\nu = -2$ | $\nu = -1$ | $\nu = 0$ | $\nu = 0.3$ | $\nu = 0.7$ | $\nu = 1$ | $\nu = 2$ |
|---|---|---|---|---|---|---|---|
| Sensitivity (μm/%) | 1.79 | 1.25 | 0.57 | 0.35 | 0.05 | −0.17 | −0.83 |

Figure 8B:
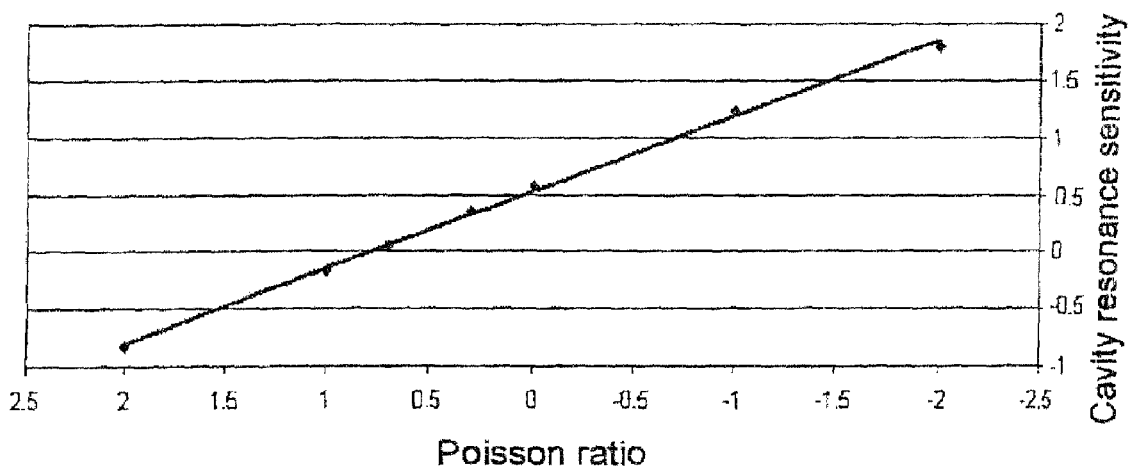

The data from the above table are graphed in FIG. 8B. It can be seen, that the dependence of a sensitivity of band pass wavelength to the strain on a Poisson ratio of the defected photonic crystal is approximately linear. The sensitivity turns into zero at a Poisson ratio $\nu \approx 0.7$, which is in a good agreement with the prediction that this zero will be at Poisson ratio $\nu = 1$ (the prediction was based on an assumption that the band pass wavelength is proportional to the defect area, but thus assumption does not hold exactly).

A possibility to design optical devices having a predetermined sensitivity to an external field is very useful. The inventors have enabled this possibility by controlling the Poisson ratio of the optical device. For example, the techniques of the present invention allow for improving inertial measurements requiring high sensitivity, by providing an optical device, which optical properties depend on the degree of the device deformation, with the desired large deformation. To this end, such an optical device is mounted on or fabricated with a flexing structure of a small Poisson ratio that will carry and actuate the optical device. For a such type of applications the flexing structure can be configured to have a very small Poisson ratio, e.g. to $\nu < -2$. For another example, the problem may be the opposite: to prevent mechanical actuating of the optical properties. To this end, an optical device can be integrated with a flexing structure/carrier that will provide to an optical property of the optical device a zero sensitivity to the deformation. In the example of FIGS. 8A-8B a role of the optical property was given to the band pass wavelength; the respective sensitivity might be turned into zero by configuring the defected photonic crystal with its carrier to undergo deformations characterized by a Poisson ratio of $\nu \approx 0.7$.

It should be noted, that the invented technique of designing an optical device of a predetermined sensitivity of an optical property to an externally exerted displacement or other field is not limited to the two-arm sensor/modulator illustrated in FIGS. 1A, 1B, and 2 as well as it is not limited to such optical property as the band pass wavelength of the defected photonic crystal (though the two-arm sensor/modulator utilizing exerted changes in the band pass wavelength of the defected photonic crystal presents a preferred embodiment of the present invention).

In other embodiments, different optical devices can be configured to have desired sensitivities of different optical properties. To this end, these devices can be integrated with, or can be carried by, or can incorporate a flexing structure of such a selected Poisson ratio that will provide for the desired sensitivity of the optical property of interest. For example in a particular embodiment, the optical device can be constituted by a photonic crystal based waveguide, the optical property can be constituted by a frequency of a ceiling of the photonic crystal band gap, and achieving of a zero sensitivity to a force exerted along some axis can be desired. A person skilled the art will readily see, how thus stated goal can be implemented by using a flexing structure of a proper Poisson ratio.

Thus, the present invention provides a sensor/modulator device for use in determining/evaluating or modulating an external field to which the device is at least partially, directly or indirectly, exposed. The device is based on a resonating waveguide structure, which is preferably in the form of a defect containing photonic crystal. The invention also provides a flexing structure configuration having a predetermined (e.g. highly positive, zero, negative) Poisson ratio and being suitable for carrying a photonic crystal based structure to enable transformation of a uniaxial force in directions along two perpendicular axes. The invention additionally provides for a photonic crystal-containing optical device of a desired sensitivity of a photonic crystal optical property such as band-structure to an external force/displacement.

Figure 9:
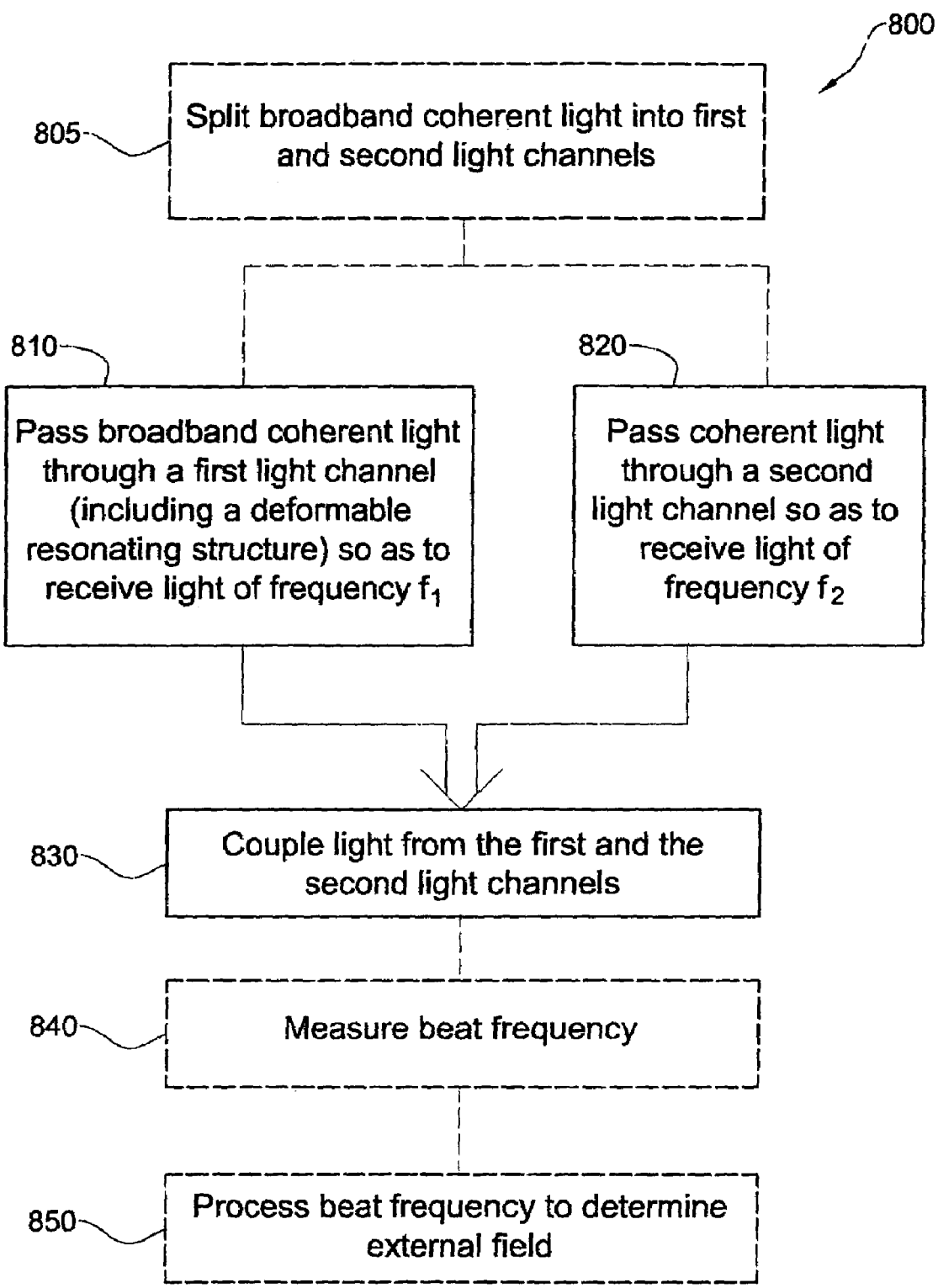
FIG. 9 illustrates a flow chart of a method of the present invention suitable to be used for detection of various fields and/or for modulation of light by these fields.

Also, the present invention provides for a novel technique for use in light processing, for example in detection of various fields or in modulation of light by the various fields. The fields, that can be detected, are of a kind directly or indirectly affecting a deformation of a certain part(s) of the sensor device (by a certain part(s) at least a resonating structure included into one of the light channels of the sensor device is meant). FIG. 9 illustrates a flow chart 800 of an example of a method of the invention. In the present example, the use of a two-channel device and measurement of beat frequency is considered, but it should be understood that the invention may not be limited to this specific example.

As shown, a first light portion of broadband coherent light is input into a first light channel including a deformable resonating structure having a resonant frequency $f_1$, depending on the deforming external field. This resonating structure can be directly or indirectly exposed to the external field. Consequently, a light component of mostly the current resonant frequency/wavelength of the resonating structure passes to the output of the first light channel (step 810).

Concurrently, a second light component being mostly of a second frequency $f_2$ of a predetermined relation with the first resonant frequency $f_1$, is passed to an output of a second light channel (step 820). This second light component is included into a second light portion that is input into the second light channel.

In some cases, the first and the second light portions can be produced in a result of light splitting into the first and the second light channels (step 805). The first and the second light portions are combined (coupled) (step 830). A beat frequency of a superposition of the first and the second light portions is measured (step 840).

The measured beat frequency can be processed to determine the value of the external field (step 850). The latter can be done using a predetermined relationship between beat frequency and value of the external field. This predetermined relationship might be obtained by theoretical modeling of the invented sensor device or by calibrating the device by operating it in the known external field.

Hence, the above described method enables modulation of light and is capable of use in sensing various external fields. In other words, this method includes the following: passing a first light portion of coherent light of multiple wavelengths through a first light channel so as to receive a first light component of a first frequency affectable by the external field (step 810); passing a second light portion through a second light channel so as to receive a second light component of a second frequency being in a predetermined relation with the first frequency (step 820); coupling the first and second light components so as to produce their superposition (step 830).

This method utilizes the first light channel including a deformable resonating structure of a resonance frequency defining and equaling the first frequency. Method 800 thus enables modulating the superposition of the first and second light components by directly or indirectly exposing the resonating structure to the external field. A frequency of the received modulation will be on a beat frequency of the first and second light components and will be indicative of the external field.

Additionally, the present invention provides for a novel technique for use in detection of the various fields, the technique based on utilizing a defected photonic crystal as the light channel including the deformable resonating structure. Preferably, the technique of the invention is used for measurements of an external force. Additionally, the technique of the invention can be improved by utilizing a negative Poisson ratio flexing structure to for transmitting an external force to the defected photonic crystal.

Those skilled in the art will readily appreciate that various modifications and changes can be applied to the embodiments of the invention as hereinbefore described without departing from its scope defined in and by the appended claims.

The invention claimed is:

1. An optical device for use in at least one of modulation of light and sensing an external field, by at least partially exposing the device to an external field, the device comprising: a waveguide structure configured to define first and second light channels, each of the first and second channels having a light input and a light output, the first and second channels being optically coupled at their outputs; the first channel comprising a first resonating structure which is deformable and has a first resonant wavelength, the second channel comprising a second resonating structure having a second resonant wavelength of a predetermined relation with said first resonant wavelength, light coupled at the outputs of said first and second channels thus presenting a superposition of first and second light components passed through the first and second resonant structures and having a beat frequency and an amplitude, the device thereby allowing exposure of at least the first channel to the external field of the kind affecting a deformation of said at least first resonant structure thus causing a change in at least the first resonant wavelength, resulting in a corresponding change in at least one of said beat frequency and said amplitude parameters of light coupled at the outputs from said first and second channels, said change being indicative of the external field, wherein at least said first channel of the waveguide structure is coupled to a flexing structure configured with a predetermined negative Poisson ratio.

2. The device of claim 1, wherein at least said first channel is a defect containing photonic crystal, the defect presenting a resonant cavity of said first resonating structure.

3. The device of claim 2, wherein the defect containing photonic crystal is configured as a cavity coupled waveguide (CCW).

4. The device of claim 1, configured such as to screen the second channel from the external field to which the first channel is exposed.

5. The device of claim 4, wherein the first and second channels are defect containing photonic crystals, the defects presenting first and second resonant cavities of the first and second resonating structures, respectively.

6. The device of claim 5, wherein the first and second resonating structures are configured such that the first and second resonant wavelengths are different but close to each other.

7. The device of claim 4, wherein the first and second wavelengths are equal.

8. The device of claim 1, configured to allow both the first and second channels to be exposed to the external field.

9. The device of claim 1, wherein the inputs of the first and second channels are optically coupled to a laser based light source system.

10. The device of claim 9, comprising an input light splitter for splitting light from the light source system into the first and second light channels, and an output coupler for coupling light propagating in the first and second light channels and directing the output coupled light onto a light detector.

11. The device of claim 1, configured and operable for sensing at least one of a mechanical strain and temperature field.

12. The device of claim 1, wherein the flexing structure is a silicon-based structure.

13. The device of claim 1, wherein the flexing structure is configured as an inversed honeycomb structure.

14. The device of claim 1, wherein the flexing structure is composed of an array of unit cells, each formed by vertical links, re-entered links, and horizontal links.

15. The device of claim 14, wherein the flexing structure is configured as a MEMS structure.

16. A method for use in at least one of modulation of light and sensing an external field, the method comprising:
passing a first light portion of coherent light of multiple wavelengths through a first light channel so as to receive a first light component of a first frequency affectable by the external field, the first light channel including a deformable resonating structure of a first resonance frequency defining and equaling said first frequency; said deformable resonating structure comprising a defected photonic crystal fixed on a Negative Poisson Ratio flexing structure exposed to an external force, constituting the external field;
passing a second light portion through a second light channel so as to receive a second light component of a second frequency being in a predetermined relation with said first frequency, said second light channel comprising a second resonating structure of a second resonant frequency defining and equaling to said second frequency, said second frequency; and
coupling said first and second light components so as to produce their superposition, thereby enabling modulating said superposition by exposing said resonating structure to the external field, said modulating being on a beat frequency of the first and second light components and being indicative of the external field.

17. The method of claim 16, comprising measuring said beats frequency of said superposition.

18. The method of claim 17, comprising processing said beats frequency so as to determine the external field.

19. The method of claim 16 comprising splitting input light so as to produce said first and the second light portions.

20. The method of claim 16 wherein the external field is a force or a displacement.

21. An optical device for use in sensing an external field, the device comprising: at least one resonating structure comprising a photonic crystal and a flexing structure carrying said photonic crystal, wherein the flexing structure has a certain negative Poisson ratio, exposure of said resonating structure to an external field resulting in a change of a resonance frequency of said resonating structure, said change being indicative of the external field.

22. The optical device of claim 21, wherein said photonic crystal is a defected photonic crystal.

23. The optical device of claim 21, wherein said photonic crystal is a substantially non-defected photonic crystal.

* * * * *

UNITED STATES PATENT AND TRADEMARK OFFICE
CERTIFICATE OF CORRECTION

PATENT NO. : 7,613,367 B2  Page 1 of 1
APPLICATION NO. : 11/365815
DATED : November 3, 2009
INVENTOR(S) : Levy et al.

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by 77 days Delete the phrase "by 77 days" and insert -- by 196 days --

Signed and Sealed this

Eleventh Day of May, 2010

David J. Kappos
*Director of the United States Patent and Trademark Office*